(12) United States Patent
Ozaki et al.

(10) Patent No.: US 9,991,948 B2
(45) Date of Patent: Jun. 5, 2018

(54) LOW COST CABLELESS GROUND STATION ANTENNA FOR MEDIUM EARTH ORBIT SATELLITE COMMUNICATION SYSTEMS

(71) Applicant: Qualcomm Incorporated, San Diego, CA (US)

(72) Inventors: Ernest Tadashi Ozaki, Poway, CA (US); William G. Ames, Poway, CA (US); Ahmad Jalali, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 15/090,094

(22) Filed: Apr. 4, 2016

(65) Prior Publication Data

US 2017/0214456 A1  Jul. 27, 2017

Related U.S. Application Data

(60) Provisional application No. 62/142,959, filed on Apr. 3, 2015.

(51) Int. Cl.
  *H01Q 3/12* (2006.01)
  *H04B 7/185* (2006.01)
  *H01Q 7/00* (2006.01)
  *H01Q 1/12* (2006.01)
  *H01Q 1/22* (2006.01)

(52) U.S. Cl.
  CPC ......... *H04B 7/18517* (2013.01); *H01Q 1/125* (2013.01); *H01Q 1/2291* (2013.01); *H01Q 3/12* (2013.01); *H01Q 7/00* (2013.01)

(58) Field of Classification Search
  CPC ........ H01Q 1/125; H01Q 1/2291; H01Q 3/12; H01Q 7/00
  USPC ......................................... 343/867
  See application file for complete search history.

(56) References Cited

U.S. PATENT DOCUMENTS

| 3,852,763 A | 12/1974 | Kreutel et al. |
| 3,993,999 A | 11/1976 | Hemmi et al. |
| 6,188,353 B1 | 2/2001 | Mitchell |

(Continued)

FOREIGN PATENT DOCUMENTS

| CN | 1078332 A | 11/1993 |
| CN | 2150630 Y | 12/1993 |

(Continued)

OTHER PUBLICATIONS

Biao D., et al., "Theoretical analysis of a parabolic torus reflector antenna with multibeam," Science in China (Series A), vol. 38 (12), Dec. 1995, pp. 1520-1531.

(Continued)

*Primary Examiner* — Andrea Lindgren Baltzel
(74) *Attorney, Agent, or Firm* — Paradice and Li LLP (57) ABSTRACT

A ground station antenna is described herein including a moving feed plate with a first power transfer unit arranged on the moving feed plate. The ground station antenna also includes a fixed plate. The moving feed plate is configured to rotate with respect to the fixed plate. The fixed plate has a second power transfer unit. The first power transfer unit and the second power transfer unit are configured to transmit and receive modulated power signals between one another through a charging link. The modulated power signals comprise wireless charging power and data signals.

20 Claims, 5 Drawing Sheets

(56) References Cited

U.S. PATENT DOCUMENTS

| | | |
|---|---|---|
| 6,195,037 B1 | 2/2001 | Gross et al. |
| 6,255,997 B1 | 7/2001 | Ratkorn et al. |
| 6,538,612 B1 | 3/2003 | King |
| 7,627,284 B2 | 12/2009 | Wang |
| 2002/0130808 A1 | 9/2002 | Fukushima et al. |
| 2010/0259447 A1 | 10/2010 | Crouch |
| 2011/0287713 A1 | 11/2011 | Ali et al. |
| 2012/0013506 A1 | 1/2012 | Halavi et al. |
| 2015/0097727 A1 | 4/2015 | Ozaki et al. |

FOREIGN PATENT DOCUMENTS

| | | |
|---|---|---|
| DE | 102007056329 A1 | 5/2009 |
| EP | 1536517 A1 | 6/2005 |
| EP | 2747193 A1 | 6/2014 |
| FR | 2701169 A1 | 8/1994 |
| JP | S576281 B1 | 2/1982 |
| JP | S62154905 A | 7/1987 |
| JP | H09232861 A | 9/1997 |
| JP | 2000082918 A | 3/2000 |
| JP | 2005167402 A | 6/2005 |
| WO | 2009065651 A1 | 5/2009 |

OTHER PUBLICATIONS

International Search Report and Written Opinion—PCT/US2014/056672—ISA/EPO—dated Jun. 25, 2015.
"Paraboloid Reflector Antenna", Abstract of New Technology,, Jan. 1, 1978 (Jan. 1, 1978), p. 2, XP001382765, the whole document.
International Search Report and Written Opinion—PCT/US2016/025933—ISA/EPO—dated May 24, 2016.

LOW COST CABLELESS GROUND STATION ANTENNA FOR MEDIUM EARTH ORBIT SATELLITE COMMUNICATION SYSTEMS

CROSS-REFERENCE TO RELATED PATENT APPLICATIONS

This application claims priority from Provisional Application U.S. Application 62/142,959, filed Apr. 3, 2015, incorporated herein by reference in its entirety.

TECHNICAL FIELD

The present disclosure generally relates to satellite communication systems. More specifically, the present disclosure relates to low cost cableless ground station antennas for medium earth orbit satellite communication systems.

BACKGROUND

Ground station antennas that are designed to track non-geostationary satellites in mid-earth orbits (or medium earth orbits) (MEO) are often high-gain parabolic reflector-type antennas. Parabolic reflectors provide narrow beam widths and higher gain, and are pointed to maintain communication with the satellites. Movement of the reflector may be performed with expensive and complex mechanically-driven gimbaled systems that perform movement of a large and heavy antenna dish structure.

Because of the orbital dynamics of MEO satellites, simultaneous communication with two satellites provides uninterrupted service. As one satellite leaves the field of view of the ground station, another satellite enters the field of view. This often results in a system using two complex and expensive gimbaled reflector systems. A similar approach uses a fixed phased array antenna; however, the cost and complexity of the beam forming electronics to steer the beams is expensive and complicated. In addition, for fixed phase array antenna solutions, the beam pattern shape distorts or broadens as the beam is scanned away from the bore sight direction, making it difficult to meet pattern specifications for satellite communication (SATCOM) earth station antennas levied by various regulatory bodies such as the Federal Communications Commission (FCC) or the International Telecommunications Union (ITU).

SUMMARY

A ground station antenna in accordance with an aspect of the present disclosure includes a torus shaped reflector having multiple feed points along a focal arc in front of the reflector. The ground station antenna in such an aspect further includes transceiver feeds having their electrical phase centers located on the focal arc and supported by a rotating feed platform. The transceiver feeds are configured to simultaneously track rising and falling satellites when the platform rotates. The ground station antenna in such an aspect further includes a wireless power receiver coupled to the transceiver feeds to power the transceiver feeds. The ground station antenna in such an aspect further includes a wireless signal interface coupled to the transceiver feeds to communicate signals with a base unit to perform subsequent processing.

A ground station antenna in accordance with another aspect of the present disclosure includes means for a reflecting a signal on multiple feed points along a focal arc. The ground station antenna in such an aspect further includes means for simultaneously tracking rising and falling satellites. The ground station antenna in such an aspect further includes means for rotating the tracking means along the focal arc. The rotating means is coupled to the tracking means. The ground station antenna further includes means for wirelessly powering the tracking means. The ground station antenna further includes means for wirelessly communicating signals from the tracking means to a base unit to perform subsequent processing.

A method of wireless communication using a ground station antenna having a torus shaped reflector with multiple feed points along a focal arc in front of the reflector in accordance with another aspect of the present disclosure includes simultaneously tracking rising and falling satellites by rotating transceiver feeds along the focal arc. The transceiver feeds have their electrical phase centers located on the focal arc. The method further includes wirelessly powering the transceiver feeds. The method further includes wirelessly communicating signals between the transceiver feeds and a base unit to perform subsequent processing.

A computer program product configured for wireless communication using a ground station antenna having a torus shaped reflector with multiple feed points along a focal arc in front of the reflector in accordance with another aspect of the present disclosure includes a non-transitory computer-readable medium having program code recorded thereon. The program code includes program code to simultaneously track rising and falling satellites by rotating transceiver feeds along the focal arc. The transceiver feeds have their electrical phase centers located on the focal arc. The program code also includes code to wirelessly power the transceiver feeds. The program code also includes code to wirelessly communicate signals between the transceiver feeds and a base unit to perform subsequent processing.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

In some embodiments, a ground station antenna, includes a moving feed plate, a first power transfer unit arranged on the moving feed plate; a fixed plate, wherein the moving feed plate is configured to rotate with respect to the fixed plate; and a second power transfer unit arranged on the fixed plate, wherein the first power transfer unit and the second power transfer unit are configured to communicate modulated power signals between one another through a charging link, and the modulated power signals comprise wireless charging power signals and data signals.

In some embodiments, the ground station antenna further includes a first set of electronics arranged on the moving feed plate and a second set of electronics arranged on the fixed plate, wherein the first set of electronics and the second set of electronics are configured to communicate data signals through a data communication link with one another.

In some embodiments, the data communication link and the charging link are different links.

In some embodiments, the data communication link is used to communicate a first type of data signals, and the charging link is used to communicate a second type of data signals;

In some embodiments, the first type of data signals comprises content data.

In some embodiments, the second type of data signals comprises at least one of motor control command signals, health/maintenance information, power distribution, temperature sensor signals, moisture sensor signals, failure modes, structural integrity sensor data, or environmental sensor data.

In some embodiments, the second type of data signals comprises content data.

In some embodiments, the second type of data signals comprises data signals used for controlling components of the ground station antenna.

In some embodiments, the charging link offloads data signals from the data communication link.

In some embodiments, the data communication link is a Bluetooth link, WiFi link, or optics link.

In some embodiments, the charging power signals and the data signals associated with the modulated power signals are communicated simultaneously.

In some embodiments, a first data rate associated with the data signals of the charging link is slower than a second data rate associated with the data signals of the data communication link.

In some embodiments, the first power transfer unit comprises a first loop. The second power transfer unit comprises a second loop. Each of the first loop and the second loop is an inductive loop inductively coupled to one another.

In various embodiments, the ground station antenna of claim 1, further includes a moving communication component arranged on the moving feed plate, wherein the moving communication component comprises a first processor, a fixed communication component arranged on the fixed plate. The fixed communication component comprises a second processor.

In some embodiments, the moving communication component is configured to decode the data signals received through the charging link via the first power transfer unit or encode the data signals transmitted through the charging link via the first power transfer unit.

In some embodiments, the moving communication component is coupled to a motor. The moving communication component communicates motor control signals to the motor.

In some embodiments, the fixed communication component is configured to decode the data signals received through the charging link via the second power transfer unit or encode the data signals transmitted through the charging link via the second power transfer unit.

In some embodiments, the fixed communication component is coupled to a motor. The fixed communication component communicates motor control signals to the motor.

In various embodiments, a method for providing a ground station antenna, includes providing a moving feed plate, providing a first power transfer unit arranged on the moving feed plate, providing a fixed plate, wherein the moving feed plate is configured to rotate with respect to the fixed plate, and providing a second power transfer unit arranged on the fixed plate. The first power transfer unit and the second power transfer unit are configured to communicate modulated power signals between one another through a charging link. The modulated power signals includes wireless charging power signals and data signals.

In some embodiments, a ground station antenna includes means for providing a moving feed plate, means for providing a first power transfer unit arranged on the moving feed plate, means for providing a fixed plate, wherein the moving feed plate is configured to rotate with respect to the fixed plate, and means for providing a second power transfer unit arranged on the fixed plate. The means for providing the first power transfer unit and the second power transfer unit are configured to communicate modulated power signals between one another through a charging link. The modulated power signals comprise wireless charging power signals and data signals.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Parabolic reflectors provide narrow beam widths and higher gain, and are pointed to maintain communication with the satellites. Movement of the reflector may be performed with expensive and complex mechanically-driven gimbaled systems that perform movement of a large and heavy antenna dish structure. In addition, for fixed phase array antenna solutions, the beam pattern shape distorts or broadens as the beam is scanned away from the bore sight direction, making it difficult to meet pattern specifications for satellite communication (SATCOM) earth station antennas levied by various regulatory bodies such as the Federal Communications Commission (FCC) or the International Telecommunications Union (ITU).

In accordance with an aspect of the present disclosure, a specially-shaped fixed reflector antenna or shaped reflector antenna is provided. The shaped reflector antenna allows high-quality, dual simultaneously scannable antenna beams. In one configuration, the performance of the shaped reflector antenna is independent of the beam scan angle. In addition, this configuration of the shaped reflector antenna is achieved at a lower cost and complexity compared to other systems such as complex mechanically-driven gimbaled systems and/or fixed phased array antenna solutions.

Figure 1:
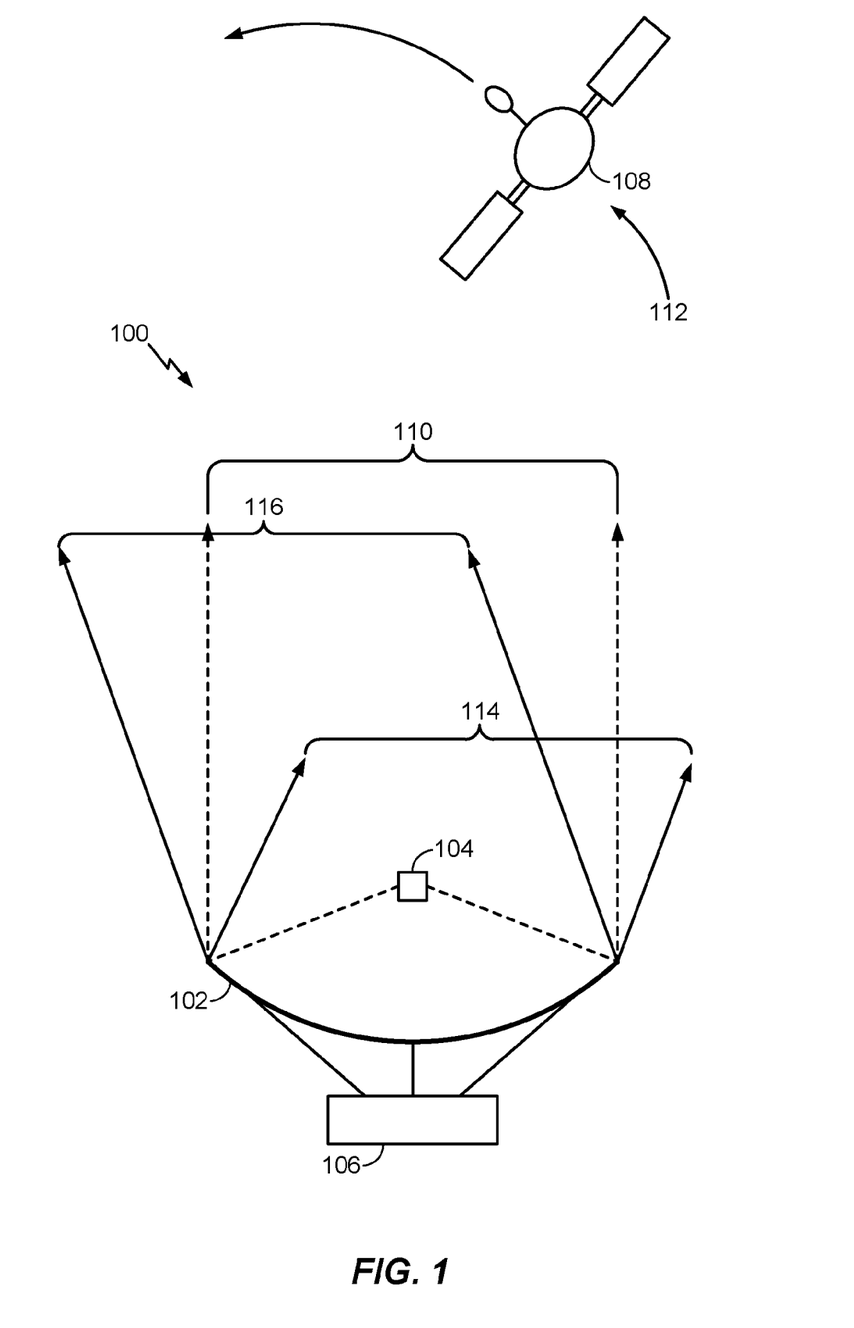
FIG. 1 is a diagram illustrating a shaped reflector antenna.

FIG. 1 is a diagram illustrating a shaped reflector antenna. In this configuration, an antenna 100 comprises a reflector 102, an element 104, and a structure 106, which may be used to communicate with satellite 108. The reflector 102 may be parabolic, such that the element 104 can be placed at or near the focus of the reflector 102 (e.g., a parabolic reflector) to create a focused beam pattern 110. If the satellite 108 is geosynchronous (or geostationary), the structure 106 merely supports the antenna 100. If satellite 108 moves along a path 112, however, the antenna 100 moves to maintain the focused beam pattern 110 direction to approximately match the path 112 of the satellite 108.

The structure 106 may contain mechanical/electrical devices that move the focused beam pattern 110 to a first position 114 and a second position 116, to maintain communications between the antenna 100 and the satellite 108. As the gain and pointing specifications of the antenna 100 increase, the structure 106 becomes prohibitively expensive. As multiple satellites are tracked in a system, the communications costs become even more costly.

Figure 2:
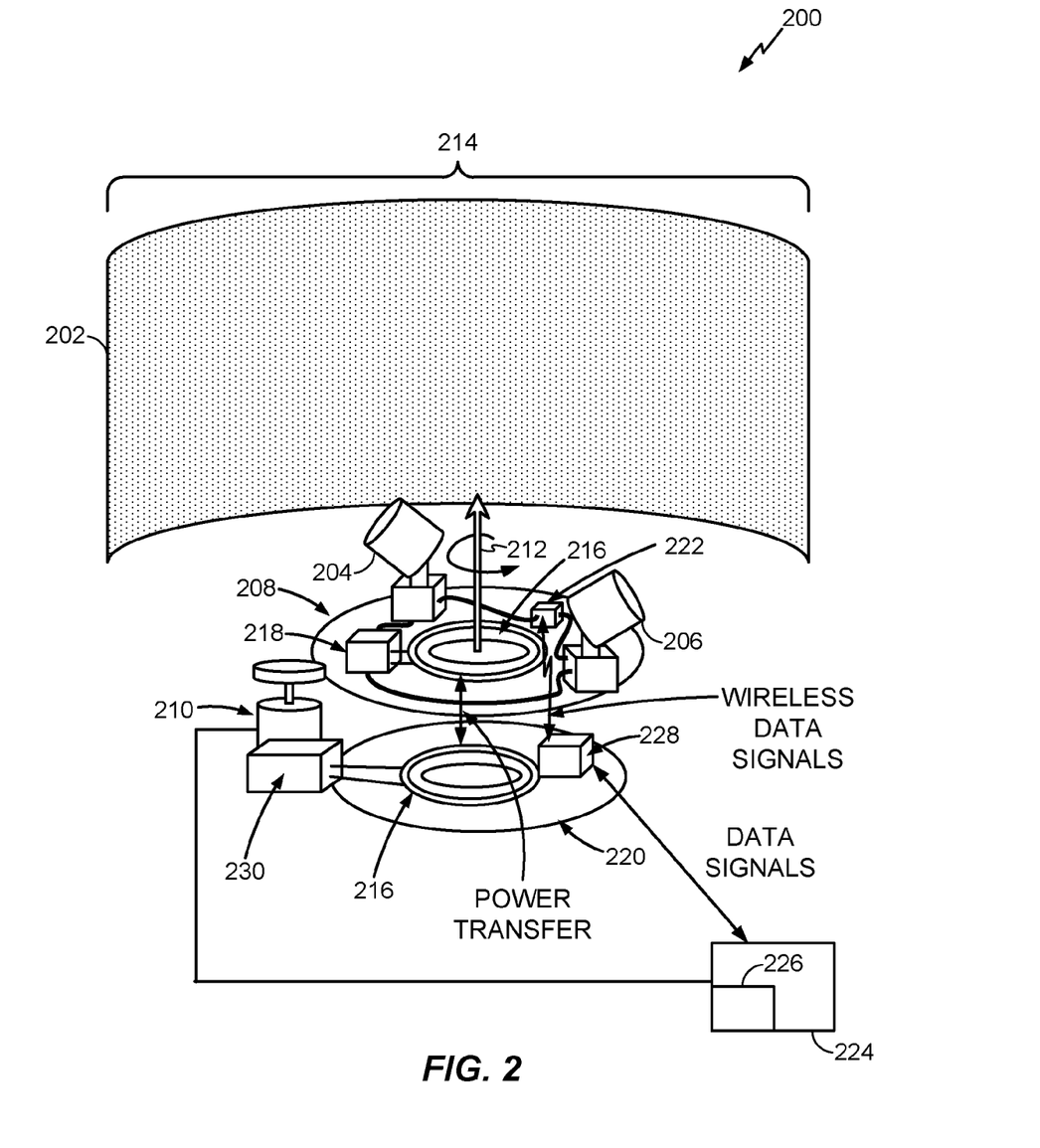
FIG. 2 is a diagram illustrating a shaped reflector antenna according to an aspect of the present disclosure.

FIG. 2 illustrates an antenna 200 including a shaped antenna reflector 202 according to an aspect of the present disclosure. In this configuration, the shaped antenna reflector 202 is selectively illuminated by a feed horn 204 and a feed horn 206, which are coupled to a moving feed plate 208. The feed horns 204 and 206 may be transceivers, receivers, or transmitters, or coupled to transceivers, receivers, and transmitters through a diplexer or other signal splitting/combining apparatus. The moving feed plate 208 may be put into motion by a motor drive 210. The motor drive 210 may be coupled to a power supply 230, or to another power source (not shown). The moving feed plate 208 may rotate around an axis 212.

As the moving feed plate 208 rotates around axis 212, or otherwise moves in another fashion, the feed horn 204 and the feed horn 206 are selectively pointed at the shaped antenna reflector 202. The electrical centers, or the boresights, or another form of alignment of the feed horn 204 and the feed horn 206 may be pointed at (e.g., "illuminate" or "illuminating") the shaped antenna reflector 202. Alternatively, because of their positions on the moving feed plate 208, one or more of the feed horns 204 or 206 may be pointed away from the shaped antenna reflector 202. By designing the shape of the shaped antenna reflector 202, the feed horn 204 and the feed horn 206 can each create an antenna beam for communication. Because the moving feed plate 208 moves the feed horn 204 and the feed horn 206, and thus the electrical centers or boresights of the feed horns 204 and 206, the antenna beams created by the feed horns are also moving. The movement of the antenna beams in the present disclosure is similar to the movement of the focused beam pattern 110 described in FIG. 1, without the expensive structures (e.g., the structures 106) to move the shaped antenna reflector 202. The costs of antenna 200 may be reduced as compared to multiple one of the antennas 100.

The reflector 202 may be an offset feed reflector or a prime focus reflector. A prime focus reflector has the feed horns 204 and 206 directly in front of the reflector 202. A prime focus reflector may cause some deterioration in the beam pattern. With a moving feed plate 208 that rotates to illuminate the reflector 202, if the reflector 202 were a prime focus reflector there may be more pattern distortion that may not be acceptable in a system using the antenna 200. To reduce the pattern distortion, an aspect of the present disclosure may use an offset fed reflector 202, where the feed horns 204 and 206 are offset from the axis of the reflector 202. This reduces the feed horns 204 and 206 blocking the reflector aperture, which increases the ability for the antenna 200 to attain high quality beams at all angles.

By using the substantially predictable orbits of, for example, medium earth orbits (MEO) satellites, the shaped antenna reflector 202 can be shaped such that the focal point (e.g., the focal line, or multiple focal points) of the shaped antenna reflector 202 approximately matches the path of the MEO satellites with which communication is being performed. In one aspect of the present disclosure, the shaped antenna reflector 202 is arranged according to a torus shape to provide continuous communication for the antenna 200. In one configuration, shaped antenna reflector 202 (e.g., torus shaped) is designed with a sufficient amount of a length 214 to allow the feed horn 204 and the feed horn 206 to track the satellites across the visible horizon at the location of antenna 200.

The shaped antenna reflector 202 of one aspect of the present disclosure provides multiple focal points that lie along a circular arc of the shaped antenna reflector 202. The shaped antenna reflector 202 shape can also be designed so the feed horn 204 and the feed horn 206 travel in a circular arc. Further, the shaped antenna reflector 202 can be offset, which means the antenna beam is directed out of the plane of the focal points of the antenna 200. This allows the feed horn 204 and the feed horn 206 to avoid blocking an aperture of the shaped antenna reflector 202, resulting in an improved gain and pattern side lobe characteristics. Because the shaped antenna reflector 202 is toroid-shaped, the beam shape of the antenna 200 may remain the same regardless of the location of the feed horn 204 and the feed horn 206 on the arc.

As the feed horn 204 illumination traverses the length 214 of the shaped antenna reflector 202 via rotation of the moving feed plate 208, the satellite that the feed horn 204 communicates with begins to approach the horizon. By appropriately spacing the feed horn 204 and the feed horn 206 on the moving feed plate 208, as another satellite appears in the field of view of the antenna 200, the feed horn 206 can begin communicating with this satellite by illuminating the shaped antenna reflector 202. The illumination provided by the feed horn 206 may overlap the illumination provided by the feed horn 204; however, because of the length 214 of the shaped antenna reflector 202, the feed horn 204 and the feed horn 206 may illuminate different portions of the shaped antenna reflector 202.

As the communication link between the feed horn 206 and a satellite becomes usable, handoffs from the communication link being supported by the feed horn 204 to the communications links now available from the feed horn 206 may begin. As a result, the communications links supported by the antenna 200 may be continuous in nature. As the satellite that the feed horn 204 is communicating with begins to leave the field of view of the antenna 200 (e.g., begins to approach the horizon, or the communication link being supported by the feed horn 204 begins to degrade) the feed horn 206 may handle the communications links for the antenna 200. The feed horn 206 then illuminates the length 214 of the shaped antenna reflector 202, and the moving feed plate 208 rotates to maintain the communications link of the feed horn 206. This allows the feed horn 206 to follow (e.g., "track") the satellite to maintain the satellite communications.

In a similar fashion, as the feed horn 206 communicating with the satellite begins to leave the field of view of the antenna 200, the feed horn 204 is rotated back. Rotation of the feed horn 204 may be performed by adjusting the moving feed plate 208 to start another handoff procedure to a satellite that is coming into the field of view, thereby maintaining continuous communications for the antenna 200. The moving feed plate 208 may be rotated on an axis through the center of the moving feed plate 208. Each feed horn 204 and 206 may be at a fixed location at the same radius from the center of the plate. The feed horns 204 and 206 rotate on the same arc as the focal arc of the reflector 202 to ensure proper focusing. The feed horns may rotate on a circular arc. The feed horns 204 and 206 may be situated on the moving feed plate 208 at a radius from the center of the moving feed plate 208 that coincides with the circular arc.

The feed horn 204 and the feed horn 206 may be in fixed locations on the moving feed plate 208, or may be adjustable in position and angle of illumination with respect to the shaped antenna reflector 202. The adjustability of the feed horn 204 and the feed horn 206 may allow for slight differences in the orbital dynamics of satellites in communication with the antenna 200. This adjustability may also allow adaptation to additional satellite communications systems. Further, adding more feed horns to the moving feed plate 208 may allow for additional communications links, and/or may reduce the field of view specified by the antenna 200. There may also be multiple moving feed plates 208 that may rotate at different speeds. The multiple moving feed plates 208 may be used to communicate with different satellites 108, or different satellite communications systems, to support additional communications links for antenna 200.

To provide the feed horn 204 and the feed horn 206 with power and to provide signal interaction between the feed horns 204 and 206 with other electronics, the moving feed plate 208 may include a charging loop 216 and a power interface 218. The charging loop 216 is a loop that is present on the fixed plate 220 and on the moving feed plate 208. The charging loop 216 may be used for charging batteries that power devices on the moving feed plate 208. The batteries may be located in the power interface 218.

The power interface 218 may power the devices on the moving feed plate 208 directly. The charging loop 216 on the moving feed plate 208 receives power from the power supply 230 and the power interface 218. The charging loop 216 may also pass signals by modulating the charging power. These signals will be at a low data rate, e.g., using a 6.78 MHz carrier with <100 KHz bandwidth. These signals that pass through the charging loop 216 and/or the power interface 218 may be used for low data rate communications, such as health status monitoring, built in test, horn alignment, or control signals.

The charging loop 216 allows for the wireless transfer of power (and possibly low data rate signals) from the fixed plate 220 to the feed horn 204 and the feed horn 206. The charging loop 216 also may provide power to electronics 222 or other devices on the moving feed plate 208. The charging loop 216 may be implemented with inductive coils, slip rings, and/or other power/signal interconnections. The power interface 218 may be implemented with batteries, power converters, or other power supply components. Any manner of power transfer between the moving feed plate 208 and the fixed plate 220 is envisioned as being within the scope of the present disclosure.

The electronic signals received and/or transmitted by the feed horns 204 and 206 may be converted to frequencies that are easier to transmit between the moving feed plate 208 and a fixed plate 220. For example, the electronic signals may be converted from a higher frequency to a lower frequency ("downconverted") that may be an intermediate frequency (IF) or an even lower frequency ("baseband"). These signals may be passed between the moving feed plate 208 and the fixed plate 220 through wireless transmission, using a personal area network (PAN) (e.g., Bluetooth), a wireless local area network (WLAN) (e.g., WiFi), or other transceivers be attached to the feed horn 204 and 206, or may be part of the other electronics 222 on the moving feed plate 208. The electronics 222, which may include wireless transceivers such as PAN or WLAN transceivers, may communicate in a wireless fashion with one or more fixed electronics 228 located away from the moving feed plate 208. The fixed electronics 228 may be located on the fixed plate 220, or elsewhere within the system. These fixed electronics 228 may then transfer signals between the fixed plate 220 and the computer 224, or may transfer signals to other base units to provide the communications link to other devices.

The wireless transfer of signals and power from the moving feed plate 208 to the fixed plate 220, via the charging loop 216, the power interface 218, and/or the electronics 222 and the fixed electronics 228, eliminates fixed wire connections between the moving feed plate 208 and the fixed plate 220. This enables the moving feed plate 208 to rotate freely without concern for tangling wires or other restrictive objects that may bind the moving feed plate 208 from rotating too many degrees in a single direction. If, for example, a certain length of wire were used to power the feed horn 204 and the feed horn 206, eventually, the rotation of the moving feed plate 208 would tangle the wire around the axis 212 of the moving feed plate 208. This would prevent the antenna 200 from maintaining continuous communication with the satellites as the moving feed plate 208 would have to be "reset" to untangle the wire. Further, such limitations may cause the antenna 200 to be inoperable if the wires or other signal/power carrying devices between the moving feed plate 208 and the fixed plate 220 were to break upon over-rotation of the moving feed plate 208.

In this configuration, the axes of both the fixed plate 220 and the moving feed plate 208 are aligned. The charging loop 216 and the power interface 218 are placed in/on the moving feed plate 208, and similar structures may be placed in/on the fixed plate 220. The spacing between the fixed plate 220 and the moving feed plate 208 is designed, and often minimized, so that power can be transferred from the charging loop 216 and the power interface 218 at a high efficiency (e.g., greater than 90% efficiency). The power between the fixed plate 220 and the moving feed plate 208 can be rectified, conditioned, and used to power the electronics 222, the feed horn 204 and 206, or to charge batteries or power the power interface 218 on the moving feed plate 208.

The power transfer between the fixed plate 220 and the moving feed plate 208 allows the feed horn 204 and the feed horn 206 to illuminate the reflector 202, and communicate with satellites as desired. The motor drive 210 moves the moving feed plate 208 to track the satellites as desired.

In some satellite systems, the angular distance between the feed horn 204 and the feed horn 206 is fixed at a certain angle, which may be eighty degrees. The present disclosure, however, is not limited to a fixed angular distance between the feed horn 204 and the feed horn 206. Further, the feed horn 204 and 206 can have small adjustment motors to adjust the beam pattern in azimuth and elevation that is generated by the antenna 200. By moving the feed horn 204 and the feed horn 206 up and down, or closer and farther away from the shaped antenna reflector 202, the resultant reflected antenna beam pattern changes as the antenna beam reflects from the shaped antenna reflector 202. The movement of the feed horns 204 and 206 with respect to each other may be employed to counteract the effects of the offset of the reflector 202, changes in the orbits of the satellites 108, to adjust the antenna 200 to communicate with other satellites 108, or for other reasons.

A computer 224, having a memory 226, may be connected to the motor drive 210 and/or electrically connected to the feed horn 204 and the feed horn 206 or the electronics 222 or the fixed electronics 228. The computer 224 may control the motor drive 210, either via instructions from the memory 226 or via other ways, to control the rotation of the moving feed plate 208 and/or the movement of the feed horn 204 and the feed horn 206. The computer 224, via the memory 226 or other system, may control transmission, reception, handoff, or other signal processing functions of the electronics 222 and/or the fixed electronics 228. The computer 224 may receive data signals from the electronics 222 and/or 228. The computer may receive data signals from the fixed electronics 228 in a wireless fashion or by being wired to the fixed electronics 228.

Traditional approaches for multi-beam torus reflector antennas may use multiple feed horns placed at fixed locations along the circular feed arc. To track moving satellites, radio frequency (RF) switching occurs between the multiple feed horns. Traditional approaches, however, use large aperture sizes for the feed horns to generate the proper illumination on the antenna reflector surface. The beam location may be determined by the physical location of a given feed horn 204 or 206 on the circular focal arc. However, each feed horn 204 or 206 has a finite width or diameter of the beam to illuminate the reflector 202 in a way that reduces spill over losses for the feed horn 204 or 206. The physical width, or size, of the feed horns 204 and 206 determines how close the feed horns 204 and 206 can be placed relative to each other. The physical size thus impacts how close the beams can be spaced in angle. In general, the feed horns 204 and 206, and their beams, cannot be spaced close enough together with fixed feed horn locations to avoid coverage holes when a satellite goes between the beam peak of one feed horn 204 and the beam peak from the next adjacent horn 206. This related approach makes achieving the fine angular spacing between adjacent beams for the continuous tracking of the moving satellites difficult.

The present disclosure avoids deficiencies in the related art by using small inexpensive motors with gears. The present disclosure may employ direct-drive motors for motor drive 210, or may use off-axis gear driven motors if desired. For example the motor drive 210 or other small motors may be used move the feed horn 204 and the feed horn 206, to adjust the position of the feed horn 204 and the feed horn 206. The mass of the moving feed plate 208 and/or the mass of the feed horn 204 and the feed horn 206 is much smaller and lighter than moving a much larger antenna reflector in conventional scanning reflector systems.

The antenna 200, according to one aspect of the present disclosure, achieves multiple 360 degree rotations of the feed horn 204 and the feed horn 206 in azimuth orientations. Even with adjustments made to the relative angular positions of the feed horns 204 and 206 on the moving feed plate 208, the motion is essentially reduced to a simple circular motion. This aspect of the present disclosure also may reduce the complexity of the satellite tracking algorithms. Further, one aspect of the present disclosure includes a low cost and small size mechanical steering system that is also lightweight and uses an inexpensive motor drive. A single aperture system for multiple antenna beams is also provided in contrast to using two mechanically-steered dish antennas, as in other systems. A wide angle scan may also be performed without beam distortion or gain reduction compared to switched feed parabolic reflector or phased array approaches.

The present disclosure employs, in one aspect, feed horns 204 and 206 placed at a fixed distance from the reflector 202 as the moving feed plate 208 is rotated. The curve or arc of focal points of the reflector 202 matches, at least approximately, a circle at a fixed distance from the reflector 202. This arc is where the electrical centers of the feed horns 204 and 206 are placed, which allows the feed horns 204 and 206 to properly illuminate the reflector 202. A small motor that can move the feed horns 204 and 206 along the circular focal curve a small number of degrees can act as a "vernier" to change the relative angle between the feed horns 204 and 206 or to fine tune the focus (i.e., the placement of the electrical centers) of the feed horns 204 and 206. The feed horns 204 and 206 may also be moved in elevation a small amount. By moving the feed horns 204 and 206 in elevation, the main beam may be distorted, but this movement in elevation may counteract any offset reflection characteristics of the reflector 202.

The antenna 200 may reduce beam forming or steering radio frequency (RF) electronics by having two transceiver modules versus twenty to thirty transceiver modules for switched beam reflectors or active phased arrays. Also, a simple, precise scanning technique may use a simple continuous circular (CC) pattern versus having to implement fast trace back modes. Also, the use of a wireless interface for data and power avoids cables and cables wrapping up or getting tied together. Also, this leads to better reliability because there are no moving electrical connections. In one implementation, the torus reflector of the shaped antenna reflector 202 may be altered in size to be larger or smaller than the size of the parabolic dish with the same gain.

Figure 3:
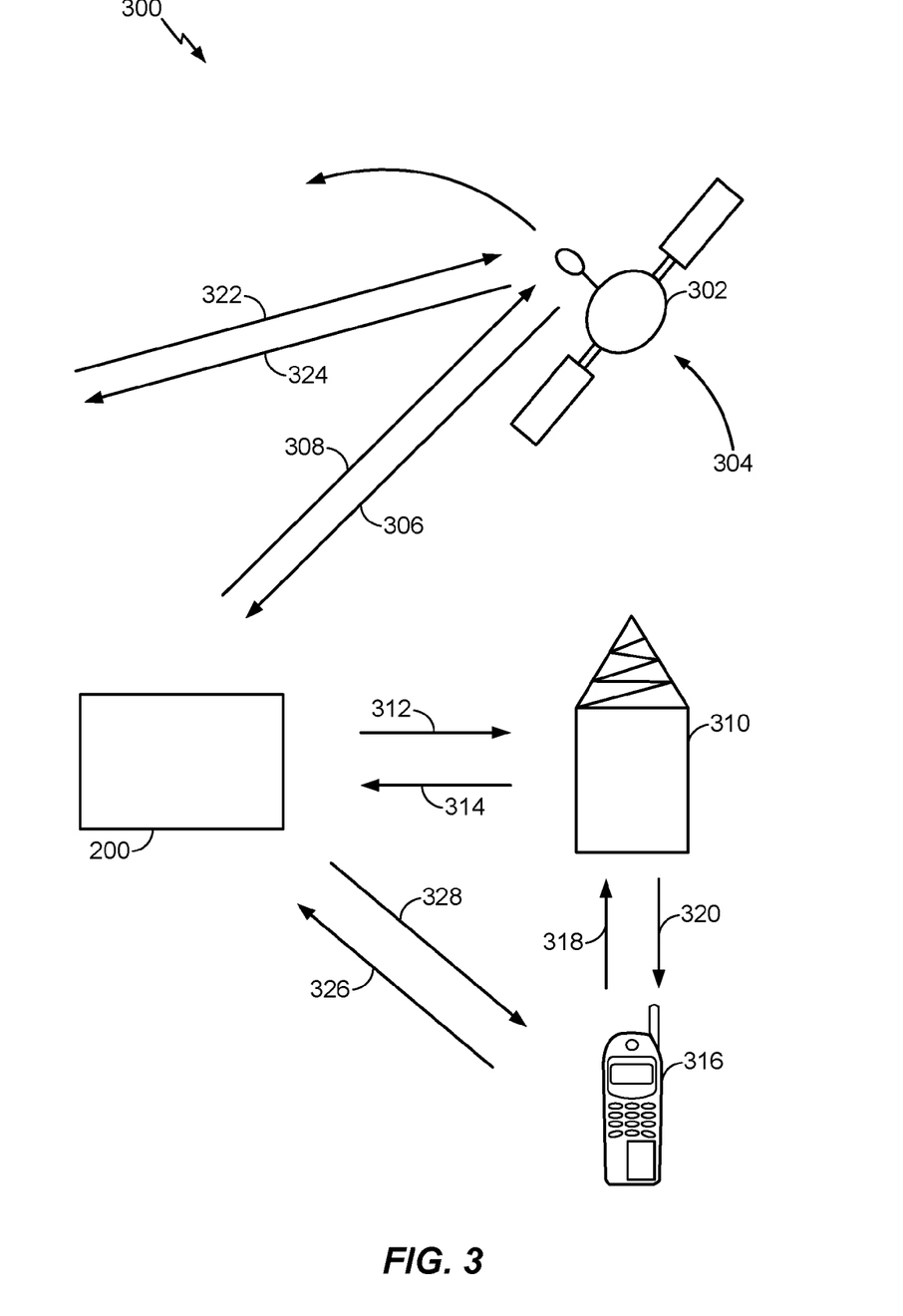
FIG. 3 is a diagram showing an exemplary wireless communication system in which an aspect of the disclosure may be advantageously employed.

FIG. 3 is a diagram showing an exemplary wireless communication system 300 in which an aspect of the disclosure may be advantageously employed. In this aspect of the present disclosure, the antenna 200 communicates with one or more satellites 302, which are travelling along an orbit 304. The satellite 302 communicates with the antenna 200 on downlink (reverse link) 304 and uplink (forward link) 306.

The antenna 200 also communicates with interface 310. The interface 310 may be a cellular telephone base station, a cellular telephone tower, a landline telephone line, or any other communications repeater or other communications system. The interface 310 communicates with the antenna 200 via the uplink 312 and the downlink 314. The interface 310 also communicates with device 316 via uplink 318 and downlink 320. The device 316 may be a mobile phone, hand-held personal communication systems (PCS) unit, portable data unit such as personal data assistants, GPS enabled device, navigation device, set top box, music player, video player, entertainment unit, fixed location data unit such as meter reading equipment, or other devices that store or retrieve data or computer instructions, or combinations thereof.

In this configuration, the device 316 may be connected to the interne or other ones of the communications links 322 and 324 through the interface 310 and the antenna 200. The device 316 may communicate directly with the antenna 200 via links 326 and 328. As shown in FIG. 3, the device 316 can be connected to any communications link 322 and/or 324 served by the satellite 302. Because the antenna 200 can track multiple ones of the satellites 302 (e.g., as described with respect to FIG. 2), the antenna 200 may be connected continuously to the communications links 322 and/or 324 through handoff procedures at the antenna 200.

Figure 4:
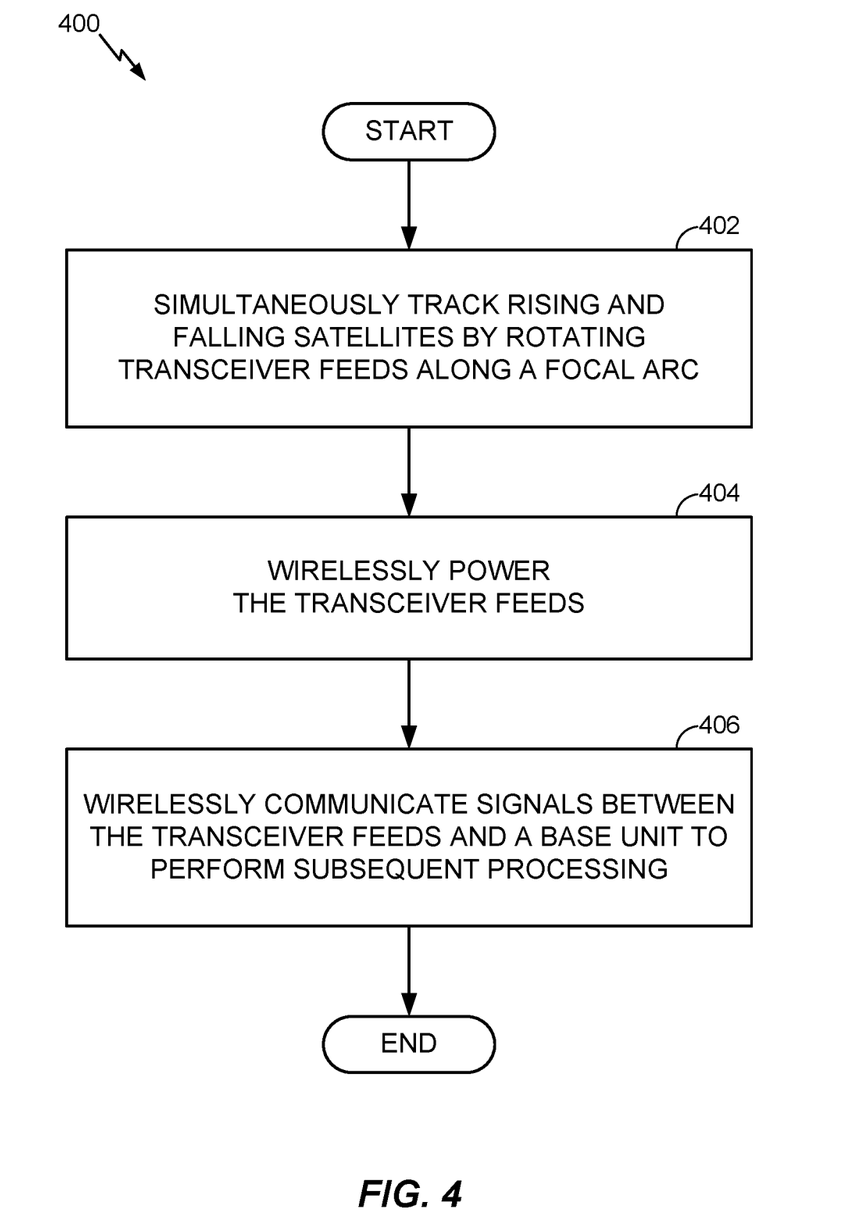
FIG. 4 is a block diagram illustrating a process chart in accordance with one aspect of the present disclosure.

FIG. 4 is a flow chart illustrating a method 400 of wireless communication using a ground station antenna having a torus shaped reflector with multiple feed points along a focal arc in front of the reflector in accordance with one aspect of the present disclosure. At block 402 rising and falling satellites are simultaneously tracked by rotating multiple transceiver feeds along the focal arc in front of the reflector. In this configuration, the transceiver feeds having their electrical phase centers located on the focal arc. At block 404 the transceiver feeds are wirelessly powered. For example, FIG. 2 illustrates wireless powering may be performed by using the power interface 218 or the charging loop 216. Wireless power transfer may occur at frequencies below 15 MHz.

Referring again to FIG. 4, at block 406 signals are wirelessly communicated between the transceiver feeds and a base unit for subsequent processing. For example, FIG. 2 illustrates the transfer of signals from the electronics 222 mounted on the moving feed plate 208 to the fixed plate 220 via fixed electronics 228 through wireless communication techniques. Power may also be transmitted via the charging loop 216 and power interface 218. The charging loop 216 and the power interface 218 may be implemented with inductive coils, slip rings, and/or a wireless connection.

In one configuration of the present disclosure, a ground station antenna includes means for a reflecting a signal on multiple feed points along a focal arc. The reflecting means may be the feed horn 204 and the feed horn 206, or other means configured to perform the functions recited by the reflecting means. In this configuration, the ground station antenna also includes means for simultaneously tracking rising and falling satellites. In one aspect of the disclosure, the tracking means may be the shaped antenna reflector 202, or other means configured to perform the functions recited by the tracking means. The ground station antenna also includes means for rotating the tracking means along the focal arc. The rotating means may be the moving feed plate 208 and/or the motor drive 210, or other means configured to perform the functions recited by the rotating means.

The ground station antenna further includes means for wirelessly powering the tracking means. The powering means may be the charging loop 216 and/or the power interface 218, or other means configured to perform the functions recited by the powering means. The ground station antenna also includes means for wirelessly communicating signals from the tracking means to a base unit. The communicating means may be the electronics 222, or other means configured to perform the functions recited by the wireless communicating means. In another aspect, the aforementioned means may be any module or any apparatus configured to perform the functions recited by the aforementioned means.

Figure 5:
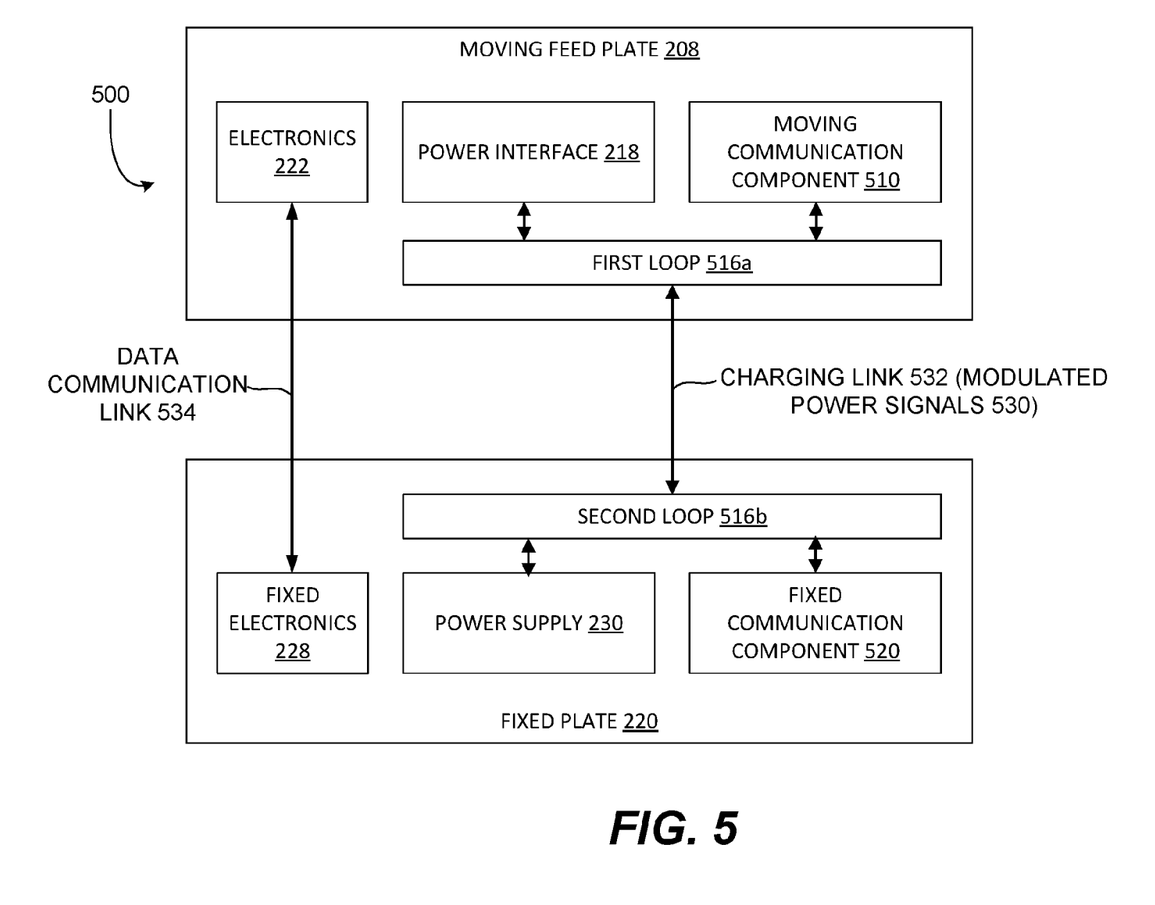
FIG. 5 is a diagram illustrating an example of a communication system including a moving feed plate and a fixed plate according to an aspect of the present disclosure.

FIG. 5 is a diagram illustrating an example of a communication system 500 between the moving feed plate 208 and the fixed plate 220 according to various embodiments. Referring to FIGS. 1-5, the power interface 218, a fixed communication component 520, and a first loop 516*a* (e.g., a first power transfer unit) may be arranged on (or in a fixed relation to) the moving feed plate 208. The power supply 230*a*, a fixed communication component 520, and a second loop 516*b* (e.g., a second power transfer unit) may be arranged on (or in a fixed relation to) the fixed plate 220. The charging loop 216 may include the first loop 516*a* and the second loop 516*b*. The loops 516*a* and 516*b* may be inductive loops configured to be wirelessly and inductively coupled to one another for communicating power and/or data in the manner described.

In various embodiments, the first loop 516*a* and the second loop 516*b* may be wirelessly and inductively coupled to establish a charging link 532. Modulated power signals 530 can be communicated (e.g., transmitted and/or received) via the charging link 532 between the first loop 516*a* (the moving feed plate 208) and the second loop 516*b* (the fixed plate 220). The first loop 516*a* and the second loop 516*b* may communicate power and as well as data through the charging link 532 using the modulated power signals 530. For instance, the modulated power signals 530 may include wireless charging power signals and data signals.

In some embodiments, the modulated power signals 530 may include both the wireless charging power signals and data signals simultaneously. In other embodiments, the modulated power signals 530 may include one of the wireless charging power signals or data signals at a given time (e.g., the wireless charging power signals and data signals may be communicated at separate time intervals). The modulated power signals 530 may have a bandwidth such as, but not limited to, 50 KHz, 100 KHz, 200 KHz, or the like.

In some embodiments, the electronics 222 provided on the moving feed plate 208 and the fixed electronics 228 provided on the fixed plate 220 may communicate via a data communication link 534. The data communication link 534 may be a Bluetooth link, WiFi link, optics link, or other suitable communication links. The data communication link 534 may be used to communication data signals between the electronics 222 and the fixed electronics. Data signals may refer to any signals that are not the wireless charging power signals.

In some embodiments, the charging link 532 may be used as an alternative or an additional link for communicating data signals to the data communication link 534, by virtue of the charging link 432 being able to support the modulated power signals 530, which includes the wireless charging power signals and the data signals. In some embodiments, the charging link 532 may have a lower data rate as compared to that of the data communication link 534.

A first type of data signals may be communicated via the data communication link 534 while a second type of data signals may be communicated via the charging link 532. In some embodiments the first type of data signals may be different from the second type of data signals. Illustrating with a non-limiting example, the first type of data signals may include content data signals received or to be transmitted by the feed horns 204, 206. The second type of data signals associated with the modulated power signals 530 may include signals such as, but not limited to, motor control command signals, health/maintenance information, power distribution, sensor data signals (e.g., temperature signals, moisture signals, failure modes, structural integrity data, environmental data, a combination thereof, and/or the like) for monitoring various aspects of the antenna 200, a combination thereof, and/or the like. In some embodiments, the second type of data signals may include control signals for controlling the system 500, including the moving feed plate 208 and the fixed plate 220. In such embodiments, the second type of data signals may not include the content data.

By differentiating types of data communicated via the charging link 532 and the data communication link 534, improved data pathway control may be realized.

In additional or alternative embodiments, the second type of data signals may also include some of the content data. In other words, the charging link 532 may offload the data communication link 534 with respect to the content data to improve data throughput. Illustrating with a non-limiting example, the data communication link 534 may communicate some of the content data while the charging link 532 may communicate control signals and some of the content data simultaneously, to offload the data communication link 534.

In some embodiments, sensors (not shown) on the moving feed plate 208 and/or the fixed plate 220 may provide sensor data corresponding to one or more sensed parameters associated with the system 500 (or one or more components thereof) or the environment of the system 500. The sensor data may be communicated via the charging link 532 (as data signals) from the moving feed plate 208 to the fixed plate 220, vice versa. Such sensor data may be provided to the computer 224 for use in association with monitoring or controlling the system 500 or components thereof. Illustrating with a non-limiting example, control signals such as, but not limited to, motor commands or motor operational data may be provided from one of the moving feed plate 208 and the fixed plate 220 to another one of the moving feed plate 208 and the fixed plate 220. Such control signals may be subsequently provided to the computer 224 or the motor 210 (or both), for example, to control and/or monitor the operation of the motor 210.

The moving communication component 510 may be directly an operably coupled to the first loop 516a in some embodiments. In other embodiments, the moving communication component 510 may be coupled to the power interface 218 or is a component of the power interface 218 (or provided in or as another component on the moving feed plate 208), and indirectly coupled to the first loop 516a through the power interface 218. The moving communication component 510 may be configured to decode data received by the first loop 516a and/or encode data to be transmitted by the first loop 516a. The moving communication component 510 may relay data received from the first loop 516a to or obtain data to be transmitted by the first loop 516a from various components of the moving feed plate 208, including, but not limited to, the power interface 218, the feed horns 204, 206, the electronics 222, and/or the like (not shown in FIG. 5 for clarity). In some embodiments, the moving communication component 510 may be coupled to the motor 210 and/or the computer 224 via a wireless or wired connection for communicating control signals such as, but not limited to, motor control signals, motor operational data signals, and/or the like.

In some embodiments, the fixed communication component 520 may be directly and operably coupled to the second loop 516b. In other embodiments, the fixed communication component 520 may be coupled to the power supply 230 or is a component of the power supply 230 (or is provided in or as another component arranged on the fixed plate 220), and is indirectly coupled to the second loop 516b through the power supply 230. The fixed communication component 520 may be configured to decode data received by the second loop 516b and/or encode data to be transmitted by the second loop 516b. The fixed communication component 520 may relay data received from the second loop 516b to or obtain data to be transmitted by the second loop 516b from various components of the fixed plate 220, including, but not limited to, power supply 230, the fixed electronics 228, and/or the like (not shown in FIG. 5 for clarity). In some embodiments, the fixed communication component 520 may be coupled to the motor 210 and/or the computer 224 motor control signals via a wireless or wired connection for communicating control signals such as, but not limited to, receiving motor operational data signals, and/or the like.

In some embodiments, each of the moving communication component 510 and the fixed communication component 520 may include its own processor unit (for performing functions, including, but not limited to those described herein), memory (for storing data and computer-readable instructions), network devices (for communicating with one, more, or all other components including, but not limited to those described herein), and/or the like. In other embodiments, one or both of the moving communication component 510 and the fixed communication component 520 may be implemented with hardware and software from one or more or all of the components described herein.

For a firmware and/or software implementation of portions of the present disclosure, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A ground station antenna, comprising:
   a moving feed plate;
   a first power transfer unit arranged on the moving feed plate;
   a fixed plate, wherein the moving feed plate is configured to rotate with respect to the fixed plate; and
   a second power transfer unit arranged on the fixed plate, wherein:
   the first power transfer unit and the second power transfer unit are configured to communicate modulated power signals between one another through a charging link; and
   the modulated power signals comprise wireless charging power signals and data signals.

2. The ground station antenna of claim 1, further comprising:
   a first set of electronics arranged on the moving feed plate; and
   a second set of electronics arranged on the fixed plate, wherein the first set of electronics and the second set of electronics are configured to communicate data signals through a data communication link with one another.

3. The ground station antenna of claim 2, wherein the data communication link and the charging link are different links.

4. The ground station antenna of claim 2, wherein:
   the data communication link is used to communicate a first type of data signals; and
   the charging link is used to communicate a second type of data signals.

5. The ground station antenna of claim 4, wherein the first type of data signals comprises content data.

6. The ground station antenna of claim 4, wherein the second type of data signals comprises at least one of motor control command signals, health/maintenance information, power distribution, temperature sensor signals, moisture sensor signals, failure modes, structural integrity sensor data, or environmental sensor data.

7. The ground station antenna of claim 4, wherein the second type of data signals comprises content data.

8. The ground station antenna of claim 4, wherein the second type of data signals comprises data signals used for controlling components of the ground station antenna.

9. The ground station antenna of claim 2, wherein the charging link offloads data signals from the data communication link.

10. The ground station antenna of claim 2, wherein the data communication link is a Bluetooth link, WiFi link, or optics link.

11. The ground station antenna of claim 1, wherein the charging power signals and the data signals associated with the modulated power signals are communicated simultaneously.

12. The ground station antenna of claim 1, wherein a first data rate associated with the data signals of the charging link is slower than a second data rate associated with the data signals of the data communication link.

13. The ground station antenna of claim 1, wherein:
    the first power transfer unit comprises a first loop;
    the second power transfer unit comprises a second loop; and
    wherein each of the first loop and the second loop is an inductive loop inductively coupled to the other of the first loop and the second loop.

14. The ground station antenna of claim 1, further comprising:
    a moving communication component arranged on the moving feed plate, wherein the moving communication component comprises a first processor;
    a fixed communication component arranged on the fixed plate, wherein the fixed communication component comprises a second processor.

15. The ground station antenna of claim 14, wherein the moving communication component is configured to decode the data signals received through the charging link via the first power transfer unit or encode the data signals transmitted through the charging link via the first power transfer unit.

16. The ground station antenna of claim 14, wherein:
    the moving communication component is coupled to a motor; and
    the moving communication component communicates motor control signals to the motor.

17. The ground station antenna of claim 14, wherein the fixed communication component is configured to decode the data signals received through the charging link via the second power transfer unit or encode the data signals transmitted through the charging link via the second power transfer unit.

18. The ground station antenna of claim 14, wherein:
    the fixed communication component is coupled to a motor; and
    the fixed communication component communicates motor control signals to the motor.

19. A method for providing a ground station antenna, comprising:
    providing a moving feed plate;
    providing a first power transfer unit arranged on the moving feed plate;
    providing a fixed plate, wherein the moving feed plate is configured to rotate with respect to the fixed plate; and
    providing a second power transfer unit arranged on the fixed plate, wherein:
    the first power transfer unit and the second power transfer unit are configured to communicate modulated power signals between one another through a charging link; and
    the modulated power signals comprise wireless charging power signals and data signals.

20. A ground station antenna, comprising:
    means for providing a moving feed plate;
    means for providing a first power transfer unit arranged on the moving feed plate;
    means for providing a fixed plate, wherein the moving feed plate is configured to rotate with respect to the fixed plate; and means for providing a second power transfer unit arranged on the fixed plate, wherein:

the means for providing the first power transfer unit and the second power transfer unit are configured to communicate modulated power signals between one another through a charging link; and the modulated power signals comprise wireless charging power signals and data signals.

\* \* \* \* \*